US012797963B2

(12) United States Patent
Kitazawa

(10) Patent No.: US 12,797,963 B2
(45) Date of Patent: Nov. 17, 2026

(54) MACHINE TOOL

(71) Applicants: CITIZEN WATCH CO., LTD., Tokyo (JP); CITIZEN MACHINERY CO., LTD., Nagano (JP)

(72) Inventor: Kazutoshi Kitazawa, Nishishirakawa (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 806 days.

(21) Appl. No.: 18/021,142

(22) PCT Filed: Jul. 29, 2021

(86) PCT No.: PCT/JP2021/028065

§ 371 (c)(1),
(2) Date: Feb. 13, 2023

(87) PCT Pub. No.: WO2022/038985

PCT Pub. Date: Feb. 24, 2022

(65) Prior Publication Data

US 2023/0286058 A1 Sep. 14, 2023

(30) Foreign Application Priority Data

Aug. 20, 2020 (JP) ................................ 2020-139161

(51) Int. Cl.
*B23B 29/24* (2006.01)
*B23B 3/16* (2006.01)

(52) U.S. Cl.
CPC ............ *B23B 29/242* (2013.01); *B23B 3/162* (2013.01); *Y10T 29/5155* (2015.01); *Y10T 29/5168* (2015.01); *Y10T 408/37* (2015.01)

(58) Field of Classification Search
CPC ............. Y10T 29/5154; Y10T 29/5155; Y10T 29/5168; Y10T 82/2587; Y10T 408/37;
(Continued)

(56) References Cited

U.S. PATENT DOCUMENTS 3,725,987 A * 4/1973 Kurimoto ............... B23B 3/164
29/27 C
5,167,176 A * 12/1992 Brookfield ............ B23B 29/043
407/103
6,725,750 B1 * 4/2004 Feltch ................... B23B 29/242
82/120

(Continued)

FOREIGN PATENT DOCUMENTS

AT 505069 A1 * 10/2008 ........... B23B 29/242
CN 108555601 A 9/2018

(Continued)

OTHER PUBLICATIONS

Decision to Grant from corresponding Japanese Application No. 2020-139161 mailed on May 10, 2024, 4 pages with translation.

(Continued)

*Primary Examiner* — Sunil K Singh
*Assistant Examiner* — Michael Vitale
(74) *Attorney, Agent, or Firm* — Tucker Ellis LLP

(57) ABSTRACT

An automatic lathe includes a front main spindle holding a workpiece and a turret including a peripheral surface, the peripheral surface being divided into a plurality of turret surfaces, tools being mounted on the turret surfaces, the turret machining the workpiece with any of the tools selected by turning about a Z axis, wherein at least one turret surface of the turret surfaces of the turret has a distance from the Z axis shorter than that of the other turret surfaces.

7 Claims, 7 Drawing Sheets

(58) Field of Classification Search
CPC ........... B23B 3/16; B23B 3/161; B23B 3/162; B23B 29/242; B23B 29/248
USPC ....................... 29/39, 40, 50; 82/159; 408/35
See application file for complete search history.

(56) References Cited

U.S. PATENT DOCUMENTS

| | | | | |
|---|---|---|---|---|
| 2003/0221525 | A1 * | 12/2003 | Katoh | B23Q 5/045 82/121 |
| 2012/0103150 | A1 * | 5/2012 | Fukuoka | B23B 29/242 82/121 |
| 2012/0186053 | A1 | 7/2012 | Meidar et al. | |
| 2015/0040732 | A1 | 2/2015 | Ozawa | |
| 2016/0229012 | A1 | 8/2016 | Fujimoto et al. | |
| 2017/0216933 | A1 | 8/2017 | Tajima | |
| 2018/0065181 | A1 | 3/2018 | Mori et al. | |
| 2018/0117681 | A1 | 5/2018 | Aoyagi | |
| 2020/0206821 | A1 | 7/2020 | Aoyagi | |

FOREIGN PATENT DOCUMENTS

| | | | | | |
|---|---|---|---|---|---|
| CN | 208437692 | U | | 1/2019 | |
| DE | 3904281 | A1 | * | 8/1990 | B23B 3/162 |
| DE | 4430113 | A1 | * | 2/1996 | B24B 35/00 |
| JP | 58109203 | A | * | 6/1983 | |
| JP | 63-057104 | A | | 3/1988 | |
| JP | S6357105 | A | * | 3/1988 | |
| JP | H01306102 | A | | 12/1989 | |
| JP | H03126503 | U | | 3/1990 | |
| JP | H03228506 | A | | 10/1991 | |
| JP | H0441102 | A | | 2/1992 | |
| JP | 2003225802 | A | | 8/2003 | |
| JP | 20057508 | A | | 1/2005 | |
| JP | 202082300 | A | | 6/2020 | |
| TW | M297809 | U | | 9/2006 | |
| WO | WO-03084711 | A2 | * | 10/2003 | B23B 3/168 |

OTHER PUBLICATIONS

International Search Report from corresponding International Application No. PCT/JP2021/028065, mailed on Oct. 19, 2021, 6 pages with translation.

Chinese Office Action from corresponding Application No. 202180050801.7 mailed on Mar. 1, 2025, 12 pages with translation.

Taiwanese Office Action from corresponding Application No. 110129620 mailed on Dec. 27, 2024, 14 pages with translation.

* cited by examiner

MACHINE TOOL

CROSS-REFERENCE TO RELATED APPLICATION

The present application is based on and claims priority to Japanese Patent Application No. 2020-139161, filed on Aug. 20, 2020, the disclosure of which is hereby incorporated by reference in its entirety.

TECHNICAL FIELD

This disclosure relates to a machine tool including a turret.

BACKGROUND ART

A machine tool including a turret and a main spindle holding a workpiece is known (see e.g., JP2003-225802A). The turret includes a peripheral surface divided into a plurality of attachment surfaces. Each of the attachment surfaces includes a tool mounting portion. In this machine tool, the turret is turnable to machine the workpiece held by the main spindle with a tool mounted on the selected tool mounting portion.

A machine tool capable of performing indexing that changes an angle relative to a main spindle is also proposed (see e.g., JP2013-226611A). In such a machine tool, a so-called B-axis turning (rotation about Y axis) tool unit is attached to a tool mounting portion.

SUMMARY

However, as the B-axis turning tool unit turns about an axis of an attachment surface (Y axis orthogonal to attachment surface) to which the tool unit is attached, the B-axis turning tool unit requires therearound a large space to avoid interference with surroundings (e.g., main spindle and cover) due to the turning of the tool unit.

A machine tool in which such a large space is not maintained requires to limit the turning angle of the B-axis turning tool unit to a range having no interference with surroundings.

The present disclosure has been made in view of the above circumstances, and an object of the present disclosure is to provide a machine tool that is no need to maintain a large space around a tool unit and limit the turning angle of the tool unit.

To solve the above problem, the present disclosure provides a machine tool including a main spindle that holds a workpiece and a turret including a peripheral surface about a turning axis and an end surface orthogonal to the turning axis, the peripheral surface being divided into a plurality of attachment surfaces, tools being mounted on the plurality of attachment surfaces, respectively, the turret machining the workpiece with any of the tools in a turned position selected by turning about the turning axis, wherein at least one attachment surface of the attachment surfaces of the turret has a distance from the turning axis shorter than that of the other attachment surfaces.

DESCRIPTION OF EMBODIMENTS

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, an automatic lathe 100 that is one example of a machine tool according to the present disclosure will be described with reference to the drawings.

Figure 1:
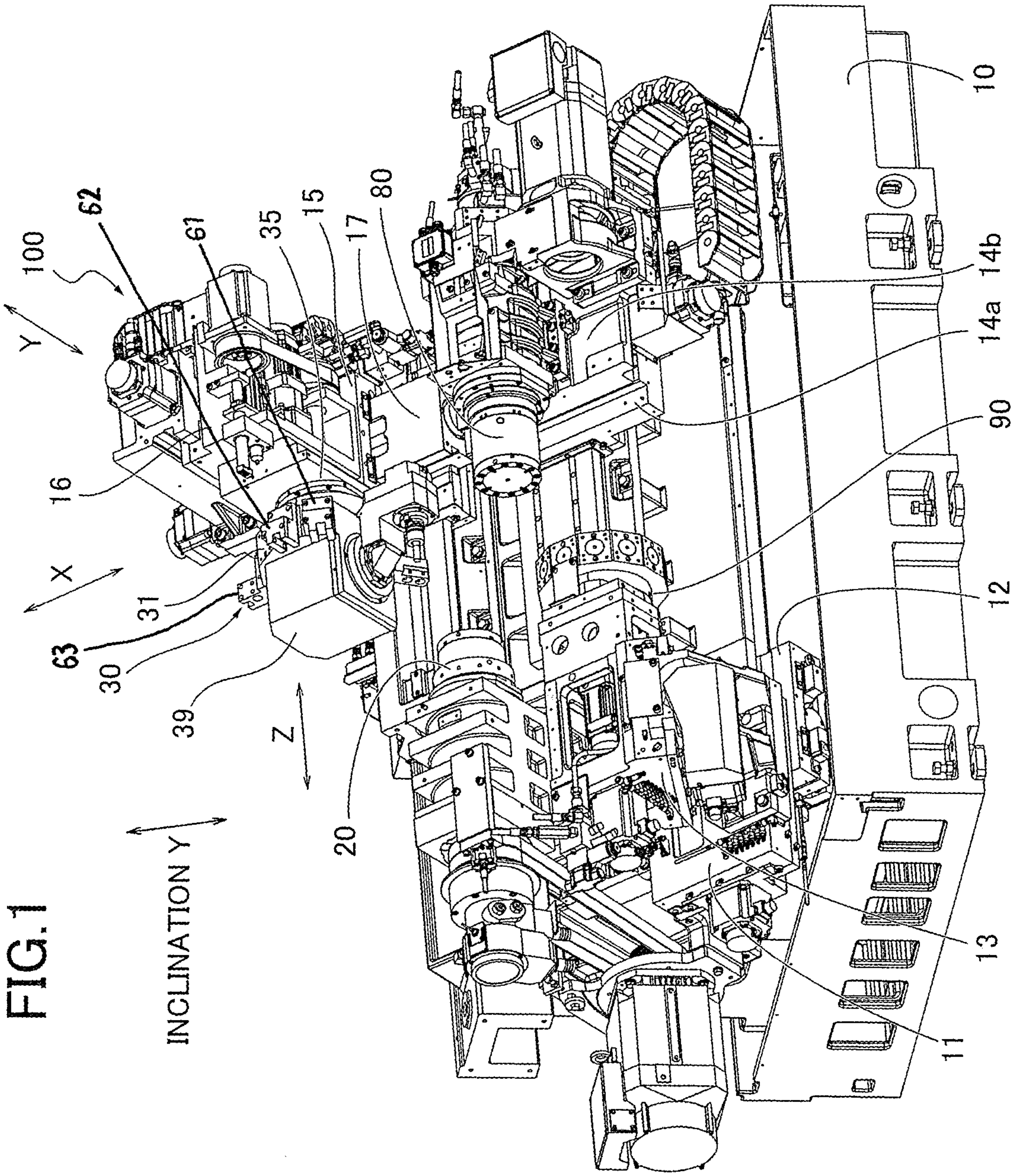
FIG. 1 is a perspective view illustrating a main configuration of an automatic lathe that is one embodiment of the present disclosure.

FIG. 1 is a perspective view illustrating a main configuration of the automatic lathe 100 that is one embodiment of the present disclosure. The illustrated automatic lathe 100 includes a bed 10 in which a front main spindle 20, a first turret tool post 30, a rear main spindle 80, and a second turret tool post 90 are installed.

Figure 4:
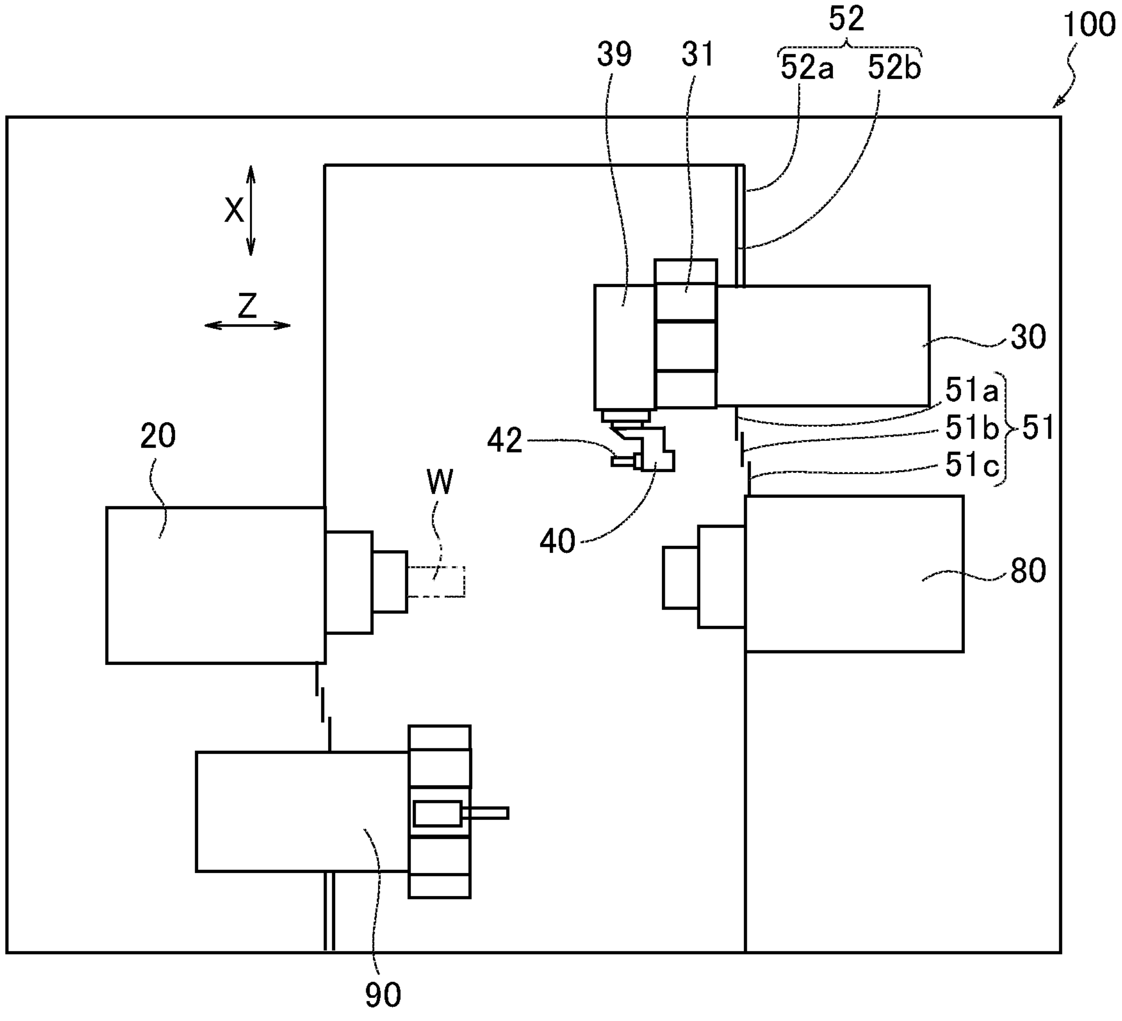
FIG. 4 is a plan view schematically illustrating a space including a part of a front main spindle, a part of a first turret tool post, a part of a rear main spindle, and a part of a second turret tool post, the space being separated into a machining room, and the first turret tool post staying away from the front main spindle.
Figure 5:
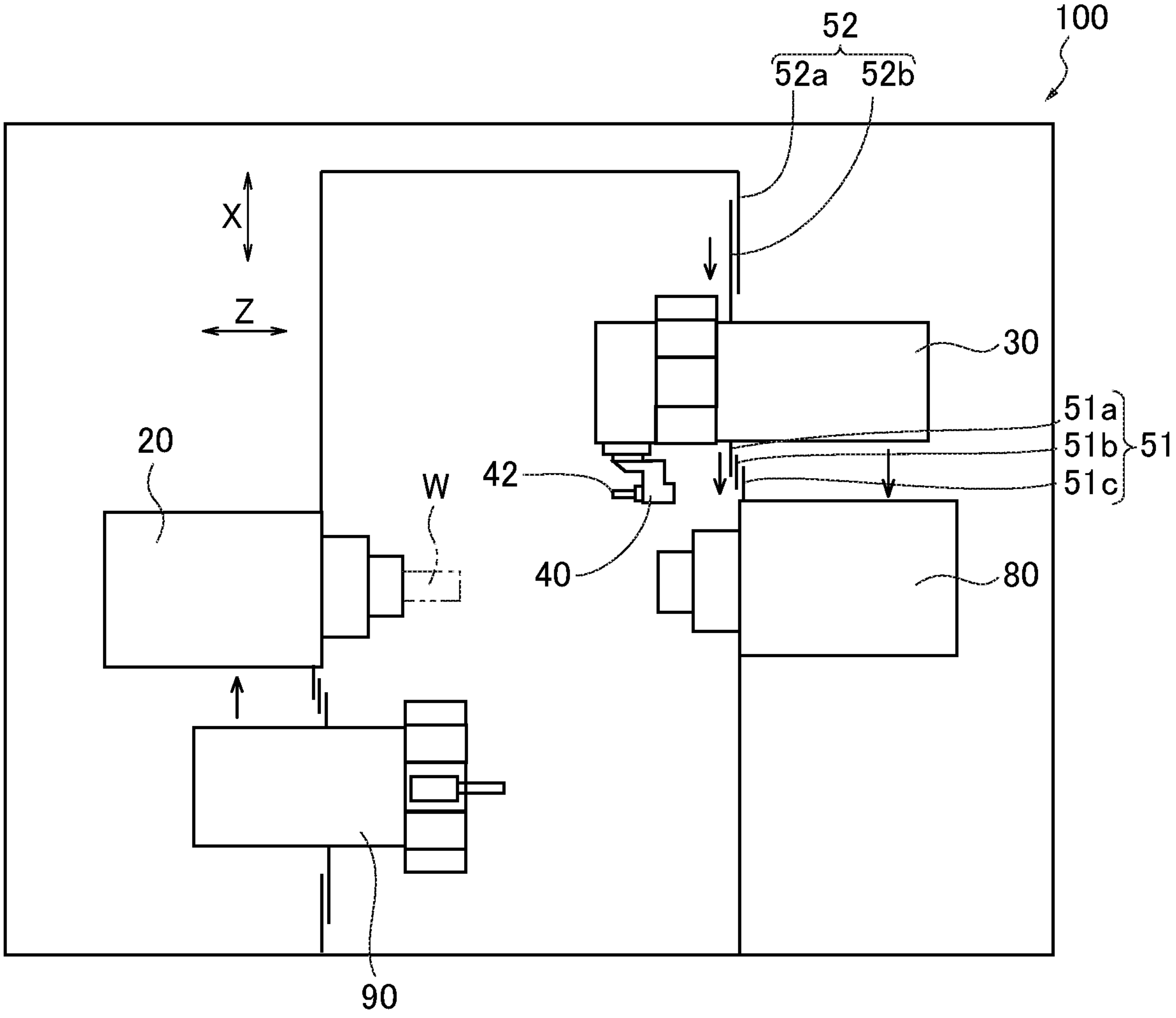
FIG. 5 is a plan view schematically illustrating a space including a part of the front main spindle, a part of the first turret tool post, a part of the rear main spindle, and a part of the second turret tool post, the space being separated into the machining room, and the first turret tool post coming close to the front main spindle.

The front main spindle 20 includes in a leading end thereof a collet chuck holding a bar workpiece W (refer to FIGS. 4, 5). The front main spindle 20 is rotatable about a Z axis that is the extending direction of the axis of the front main spindle 20 to rotate the held workpiece W about an axis (Z axis).

The rear main spindle 80 is disposed to face the front of the Z axis direction of the front main spindle 20 (in front of front end of front main spindle 20 in Z axis direction (direction of first turret tool post 30)). The rear main spindle 80 also includes in a leading end thereof a collet chuck. The workpiece held by the front main spindle 20 is received by the collet chuck of the rear main spindle 80 to be held.

The Rear Main Spindle 80 is Also Rotatable about the Z Axis that is the Extending Direction of the Rear Main Spindle 80 to Rotate the Held Workpiece W about an Axis (Z Axis).

The rear main spindle 80 is installed in a rear main spindle X axis slide 14*b*. The rear main spindle X axis slide 14*b* is installed in a rear main spindle Z axis slide 14*a*. The rear main spindle Z axis slide 14*a* is movable in the Z axis direction relative to the bed 10, and the rear main spindle X axis slide 14*b* is movable in the X axis direction relative to the rear main spindle Z axis slide 14*a*. The X axis is inclined at a predetermined angle (e.g., about 60 degrees) relative to the horizontal plane.

The rear main spindle 80 is thereby installed to be movable in the Z axis direction and the X axis direction relative to the bed 10.

The first turret tool post 30 is disposed in parallel with the rear main spindle 80 in front of the front main spindle 20 in the Z axis direction (in front of front end of front main spindle 20 in Z axis direction). The first turret tool post 30 machines the workpiece W (see FIG. 4) held by the front main spindle 20 and the workpiece W held by the rear main spindle 80 with a predetermined tool.

The first turret tool post 30 is installed in a first tool post Y axis slide 16. The first tool post Y axis slide 16 is installed in a first tool post X axis slide 15. The first tool post X axis slide 15 is installed in a first tool post Z axis slide 17.

The first tool post Z axis slide 17 is installed to be movable along the Z axis direction relative to the bed 10. The first tool post X axis slide 15 is installed in the first tool post Z axis slide 17 to be movable along the X axis direction orthogonal to the Z axis direction. The first tool post Y axis slide 16 is installed in the first tool post X axis slide 15 to be movable along the Y axis direction orthogonal to the Z axis direction and the X axis direction.

The first turret tool post 30 moves in the X axis direction relative to the workpiece W held by the front main spindle 20 and projecting from the front end of the front main spindle 20 when the first turret tool post X axis slide 15 moves in the X axis direction relative to the first tool post Z axis slide 17. The first turret tool post 30 also moves in the Y axis direction relative to the workpiece W held by the front main spindle 20 and projecting from the front end of the front main spindle 20 when the first tool post Y axis slide 16 moves in the Y axis direction relative to the first tool post X axis slide 15. The first turret tool post 30 moves similar to the workpiece W held by the rear main spindle 80 and projecting from the front end of the rear main spindle 80.

The second turret tool post 90 is disposed to face the front of the Z axis direction of the rear main spindle 80 (in front of front end of rear main spindle 80 in Z axis direction). The second turret tool post 90 machines the workpiece W held by the front main spindle 20 and the workpiece W held by the rear main spindle 80 with a tool.

The second turret tool post 90 is installed in a second tool post inclination Y axis slide 13. The second tool post inclination Y axis slide 13 is installed in a second tool post X axis slide 12. The second tool post X axis slide 12 is installed in a second tool post Z axis slide 11.

The second tool post Z axis slide 11 is installed to be movable along the Z axis direction relative to the bed 10. The second tool post X axis slide 12 is installed in the second tool post Z axis slide 11 to be movable along the X axis direction. The second tool post inclination Y axis slide 13 is installed in the second tool post X axis slide 12 to be movable along an inclination Y axis direction orthogonal to the Z axis direction and crossing the Y axis at a predetermined angle.

The second turret tool post 90 moves in the X axis direction relative to the workpiece held by the rear main spindle 80 and projecting from the front end of the rear main spindle 80 when the second tool post X axis slide 12 moves in the X axis direction relative to the second tool post Z axis slide 11. The second turret tool post 90 also moves in the inclination Y axis direction relative to the workpiece W held by the rear main spindle 80 and projecting from the front end of the rear main spindle 80 when the second tool post inclination Y axis slide 13 moves in the inclination Y axis direction relative to the second tool post X axis slide 12.

Note that the second turret tool post 90 can be moved as if it moves in the Y axis direction by the combination of the movement in the inclination Y axis direction of the second tool post inclination Y axis slide 13 and the movement in the X axis direction of the second tool post X axis slide 12.

Figure 2:
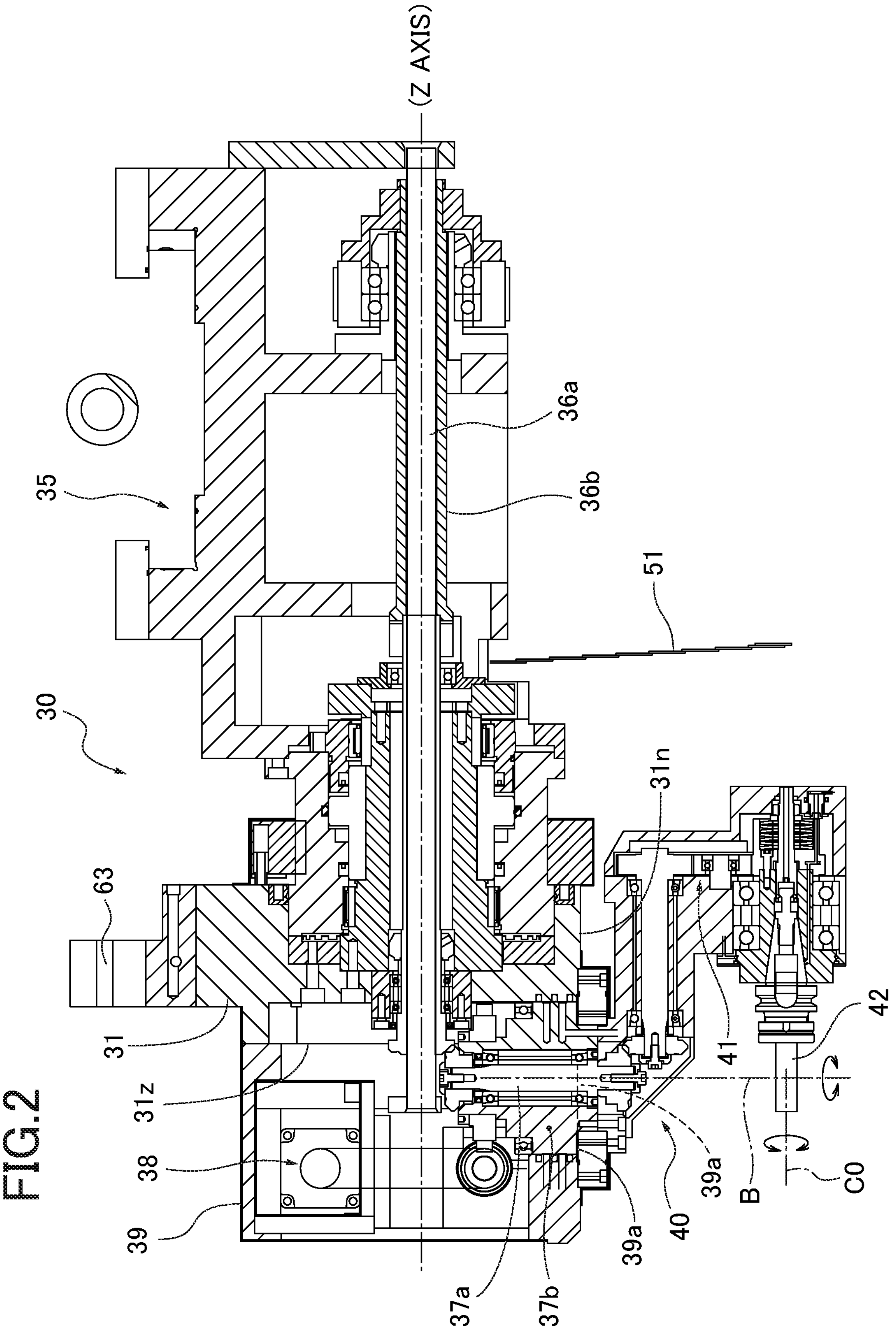
FIG. 2 is a sectional view of a first turret tool post along a Z-axis.
Figure 3:
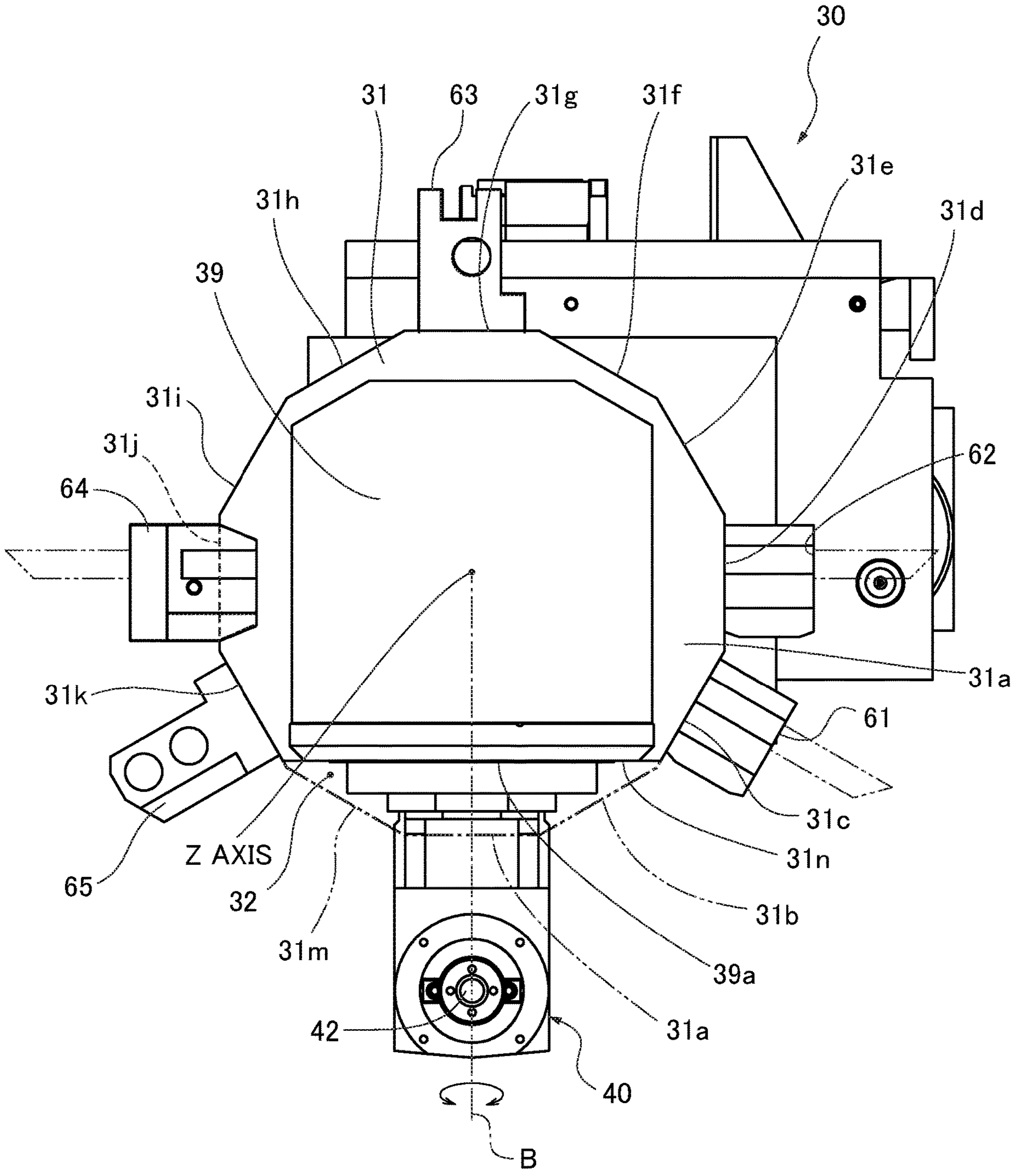
FIG. 3 is a rear view of the first turret tool post as viewed from the front of the Z axis direction.

FIG. 2 is a sectional view of the first turret tool post 30 along the Z axis. FIG. 3 is a rear view of the first turret tool post as viewed from the front of the Z axis direction.

As illustrated in FIG. 2, the first turret tool post 30 includes a main body 35, a turret 31, and an extended portion 39. The main body 35, the turret 31, and the extended portion 39 are disposed forward in a line in this order along the Z axis direction.

The main body 35 includes a rotating shaft 36*a* extending in the Z axis direction and a turning shaft 36*b* coaxial to the rotating shaft 36*a*. The rotating shaft 36*a* and the turning shaft 36*b* are rotatable about axes, respectively. The rotating shaft 36*a* and the turning shaft 36*b* independently rotate.

The rotating shaft 36*a* rotates about the Z axis to rotate a rotating tool such as a drill blade attached to the turret 31 about the axis of the rotating tool.

The turning shaft 36*b* has a tubular shape and is disposed outside the rotating shaft 36*a* in the radial direction. The turning shaft 36*b* rotates about an axis to turn the turret 31 about the Z axis relative to the main body 35.

As illustrated in FIGS. 2, 3, the turret 31 has a rectangular column external form as seen from the front of the Z axis direction. The turret 31 is attached to the main body 35 to be turnable by rotating the turning shaft 36*b* about the Z axis when the axis of the rectangular column is along with the Z axis.

The extended portion 39 is fixed to a leading end surface 31*z* of the turret 31. The extended portion 39 projects from the leading end surface 31*z* of the turret 31. The leading end surface 31*z* is orthogonal to the turning shaft 36*b* and is located in the front side of the Z axis direction. The extended portion 39 rotates about the turning shaft 36*b* together with the turret 31. The extended portion 39 includes inside thereof a turning motor 38 that is a driving force for turning an after-described rotation tool unit 40.

The turret 31 has a peripheral surface about the axis of the rectangular column. The peripheral surface is divided into 10 flat turret surfaces 31*n*, 31*c*, 31*d*, 31*e*, 31*f*, 31*g*, 31*h*, 31*i*, 31*j*, 31*k*. The turret surfaces 31*c*-31*k* have equal lengths along the circumferential direction, and also have equal lengths from the turning center (Z axis) of the turret 31.

On the other hand, the turret surface 31*n* has a length along the circumferential direction longer than that of the other turret surfaces 31*c*-31*k*, and a length from the turning center (Z axis) of the turret 31 shorter than that of the other turret surfaces 31*c*-31*k*.

Herein, one turret surface 31*n* different from the other nine turret surfaces 31*c*-31*k* will be described in detail. A turret typically includes all turret surfaces having an equal length along the circumferential direction and an equal length from the turning center so as to obtain an equal weight balance about the turning axis. That is, a typical turret has a regular polygonal rectangular column shape.

The turret 31 of the present embodiment basically has a regular dodecagon rectangular column shape in combination with the other nine turret surfaces 31*c*-31*k* when three virtual turret surfaces 31*a*, 31*b*, 31*m* illustrated by a two-dot chain line in FIG. 3 are formed instead of the turret surface 31*n*.

Note that the three virtual turret surfaces 31*a*, 31*b*, 31*m* have a length along the circumferential direction that is the same as that of the other nine turret surfaces 31*c*-31*k* and also has a length from the turning center (Z axis) of the turret 31 that is the same as that of the other nine turret surfaces 31*c*-31*k*.

That is, the turret 31 of the present embodiment has a single flat turret surface 31*n* instead of the three turret surfaces 31*m*, 31*a*, 31*b* formed between the turret surface 31*k* and the turret surface 31*c* in the virtual regular dodecagon regular column typical turret.

When the regular dodecagon rectangular column typical turret is considered as a standard, the turret 31 of the present embodiment is configured by cutting the consecutive three turret surfaces 31*m*, 31*a*, 31*b* in the circumferential direction of the rectangular column with one flat surface to obtain the single turret surface 31*n* with the cut flat surface.

However, the turret 31 of the present embodiment has only an assumed shape in which the external form having a regular dodecagon rectangular column as a standard is cut. The turret 31 is not a turret obtained by actually forming a regular dodecagon rectangular column turret, and then forming a decagon rectangular column by cutting a part of the regular dodecagon rectangular column. In addition, it may be possible to have a decagon rectangular column shape by forming a regular dodecagon rectangular column turret, and then cutting a part of the regular dodecagon rectangular column turret.

Tool holders 61, 62, 63, 64, 65 on which tools such as cutting tools illustrated by a two-dot chain imaginary line are mounted are attached to the nine turret surfaces 31*c*-31*k* out of the 10 turret surfaces 31*n*, 31*c*-31*k*. A tool except a cutting tool can be attached to the tool holder.

The first turret tool post 30 moves in the X axis direction by the first tool post X axis slide 15, and moves in the Y axis direction by the first tool post Y axis slide 16, and moves in the Z axis direction by the first tool post Z axis slide 17, so that the tool attached to the turret surface in the turned position selected by turning the turret 31 about the turning shaft 36*b* contacts the workpiece W rotatably held by the front main spindle 20. The tool thereby machines the workpiece W.

An extended turret surface 39*a* consecutive to the turret surface 31*n* is provided in the extended portion 39 projecting from the leading end surface 31*z* of the turret 31 in the direction of the front main spindle 20 as the Z axis direction. The extended turret surface 39*a* is the surface of the extended portion 39 that is provided within the same plane as the turret surface 31*n* as the turret surface 31*n* of the turret 31 is extended toward the front main spindle 20 in the Z axis direction.

The rotation tool unit 40 is attached across the turret surface 31*n* and the extended turret surface 39*a*. That is, the rotation tool unit 40 is attached in a position shifted toward the leading end surface 31*z* of the turret relative to the tool attached to the other turret surfaces. The rotation tool unit 40 is turnable about the axis B orthogonal to the turret surface 31*n* and the extended turret surface 39*a*. In this case, the axis B is an axis parallel to the Y axis.

The rotation tool unit 40 turns about the axis B when a rotating member 37*b* provided in the extended portion 39 rotates about the axis B by the turning motor 38 provided inside the extended portion 39. That is, the rotation tool unit 40 is a so-called B axis turning tool unit.

The rotation tool unit 40 rotates the rotation tool 42 about an axis C of the rotation tool 42 by the continuous connection between the rotating shaft 36*a* and a rotating shaft 37*a* provided in the extended portion 39 and through a transfer mechanism 41 continuously connected to the rotating shaft 37*a*.

The rotation tool unit 40 thereby machines the workpiece W held by the front main spindle 20 and/or the rear main spindle 80 with so-called B axis turning.

In the above-described automatic lathe 100, the rotation tool unit 40 turning about the B axis is attached to the extended turret surface 39*a* and the turret surface 31*n* having a length (distance) from the Z axis that is the turning center of the turret 31 shorter than that of the other turret surfaces 31*c*-31*k*. The turret surface 31*n* thereby has a length in the circumferential direction of the turret 31 longer than that of the other turret surfaces 31*c*-31*k*.

Accordingly, the rotation tool unit 40 provided in the turret surface 31*n* (and extended turret surface 39*a*) maintains a distance with a tool provided in a neighboring turret surface longer than that of rotation tool units provided in the other turret surfaces 31*c*-31*k*.

That is, as illustrated in FIG. 3, when the rotation tool unit 40 is provided in the turret surface 31*n*, the turret surfaces 31*c*, 31*k* are adjacent to the turret surface 31*n*. On the other hand, when the rotation tool unit 40 is provided in another turret surface 31*e*, for example, the turret surfaces 31*d*, 31*f* are adjacent to this turret surface 31*e*.

The distance between the rotation tool unit 40 provided in the turret surface 31*n* and the tools 61, 65 provided in the adjacent turret surfaces 31*c*, 31*k* is obviously longer than the distance between the rotation tool unit 40 provided in the turret surface 31*e* and the tool 62 provided in the adjacent turret surfaces 31*d*, 31*f*.

The automatic lathe 100 of the present embodiment, therefore, maintains around the rotation tool unit 40 provided in the turret surface 31*n* (and extended turret surface 39*a*) the space between the tools 61, 65 provided in the adjacent turret surfaces 31*c*, 31*k* and the rotation tool unit 40 larger than that in which the rotation tool unit 40 is attached to the other turret surfaces 31*c*-31*k*, and is no need to limit the turning range of the rotation tool unit 40.

The automatic lathe 100 also includes a separated machining room that limits a scattering region of chips caused by machining the workpiece W with the rotation tool 42 and also limits a scattering region of coolant splayed for cooling the heat of the rotation tool 42 and the workpiece W caused by cutting and for reducing the friction between the workpiece W and the rotation tool 42.

FIG. 4 is a plan view schematically illustrating the space including a part of the first turret tool post 30, a part of the rear main spindle 80, and a part of the second turret tool post 90, the space being separated into the machining room, and the first turret tool post 30 staying away from the front main spindle 20.

FIG. 5 is a plan view schematically illustrating a space including a part of the first turret tool post 30, a part of the rear main spindle 80, and a part of the second turret tool post 90, the space being separated as the machining room, and the first turret tool post 30 coming close to the front main spindle 20.

For example, as illustrated in FIG. 4, the workpiece W held by the front main spindle 20, the extended portion 39, and the turret 31 to which the rotation tool unit 40 is attached are disposed inside the separated machining room.

In the configuration for limiting the scattering region of the chip and the coolant as much as possible, separation plates 51, 52 separating the machining room are disposed just behind the turret 31 in the Z axis direction (position closest to turret 31 behind turret 31 when front main spindle 20 side is front).

As a conventional technique, if the rotation tool unit 40 is provided in the regular turret surfaces 31*c*-31*k* of the turret 31, the rotation tool unit 40 may interfere with the separation plate 51, for example, upon the turning of the rotation tool unit 40 about the B axis.

However, in the automatic lathe 100 of the present embodiment, as the rotation tool unit 40 is provided across the turret surface 31_n_ and the extended turret surface 39_a_, the rotation tool unit 40 is disposed in a position shifted toward the front main spindle 20 (leading end surface 31_z_) in the Z axis direction relative to the rotation tool unit 40 provided only in the turret surface 31_n_.

As a result, the distance (distance along Z axis direction) between the rotation tool unit 40 and the separation plate 51 located behind the turret 31 can be increased to be larger than that of the rotation tool units provided in the regular turret surfaces 31_c_-31_k_.

Accordingly, the automatic lathe 100 of the present embodiment maintains around the rotation tool unit 40 is provided in the turret surface 31_n_ and the extended turret surface 39_a_ the space between the separation plates 51, 52 and the rotation tool unit 40 larger than that in which the rotation tool unit 40 is attached to the other turret surfaces 31_c_-31_k_, and is no need to limit the turning range of the rotation tool unit 40.

As the first turret tool post 30 is movable in the X axis direction, the separation plates 51, 52 connected to the first turret tool post 30 along the X axis direction stretch and shrink along the movement of the first turret tool post 30 in the X axis direction.

More specifically, in FIG. 4, the separation plate 52 disposed above the first turret tool post 30 in the X axis direction has separation board pieces 52_a_, 52_b_ divided into two pieces. In this case, the two separation board pieces 52_a_, 52_b_ are overlapped in a shrunk state. The separation plate 51 disposed under the first turret tool post 30 in the X axis direction has separation board pieces 51_a_, 51_b_, 51_c_ divided into three pieces. In this case, the three separation board pieces 51_a_, 51_b_, 51_c_ are disposed in a stretched state to be misaligned with each other in the X axis direction.

As illustrated in FIG. 5, the two separation board pieces 52_a_, 52_b_ disposed in the upper side of the figure in the X axis direction are misaligned in the X axis direction, and have lengths stretched in the upper side in the X axis direction to maintain the separated state with the separation plate 52 when the two separation board pieces 52_a_, 52_b_ move downwardly in the X axis direction of the first turret tool post 30.

On the other hand, the three separation board pieces 51_a_, 51_b_, 51_c_ disposed in the lower side of the figure in the X axis direction are overlapped to each other, and have lengths shrunk in the lower side in the X axis direction to maintain the separated state with the separation plate 52.

As to the automatic lathe 100 of the present embodiment, the first turret tool post 30 is mainly described in view of the relationship with the workpiece W held by the front main spindle 20 and the workpiece W held by the rear main spindle 80. However, the second turret tool post 90 machining the workpiece W held by the rear main spindle 80 and the workpiece W held by the front main spindle 20 may be configured similar to the first turret tool post 30.

In the automatic lathe 100 of the present embodiment, the rotation tool unit 40 turning about the B axis may not be provided across the turret surface 31_n_ and the extended turret surface 39_a_. The rotation tool unit 40 may be provided only in the extended turret surface 39_a_ without being provided in the turret surface 31_n_, or may be provided only in the turret surface 31_n_.

That is, in the automatic lathe 100, the rotation tool unit 40 turning about the B axis should be attached to the turret surface 31_n_ (or extended turret surface 39_a_) having a length (distance) from the Z axis that is the turning center of the turret shorter than that of the other turret surfaces 31_c_-31_k_.

In addition, when the rotation tool unit 40 is provided only in the turret surface 31_n_, the center (B axis) of the turning of the rotation tool unit 40 may be the same as the attachment positions of the tools attached to the other turret surfaces 31_c_-31_k_. However, it is preferable for the center of the turning of the rotation tool unit 40 to be closer to the front main spindle 20 in the Z axis direction than the attachment positions of the tools attached to the other turret surfaces 31_c_-31_k_.

Figure 6:
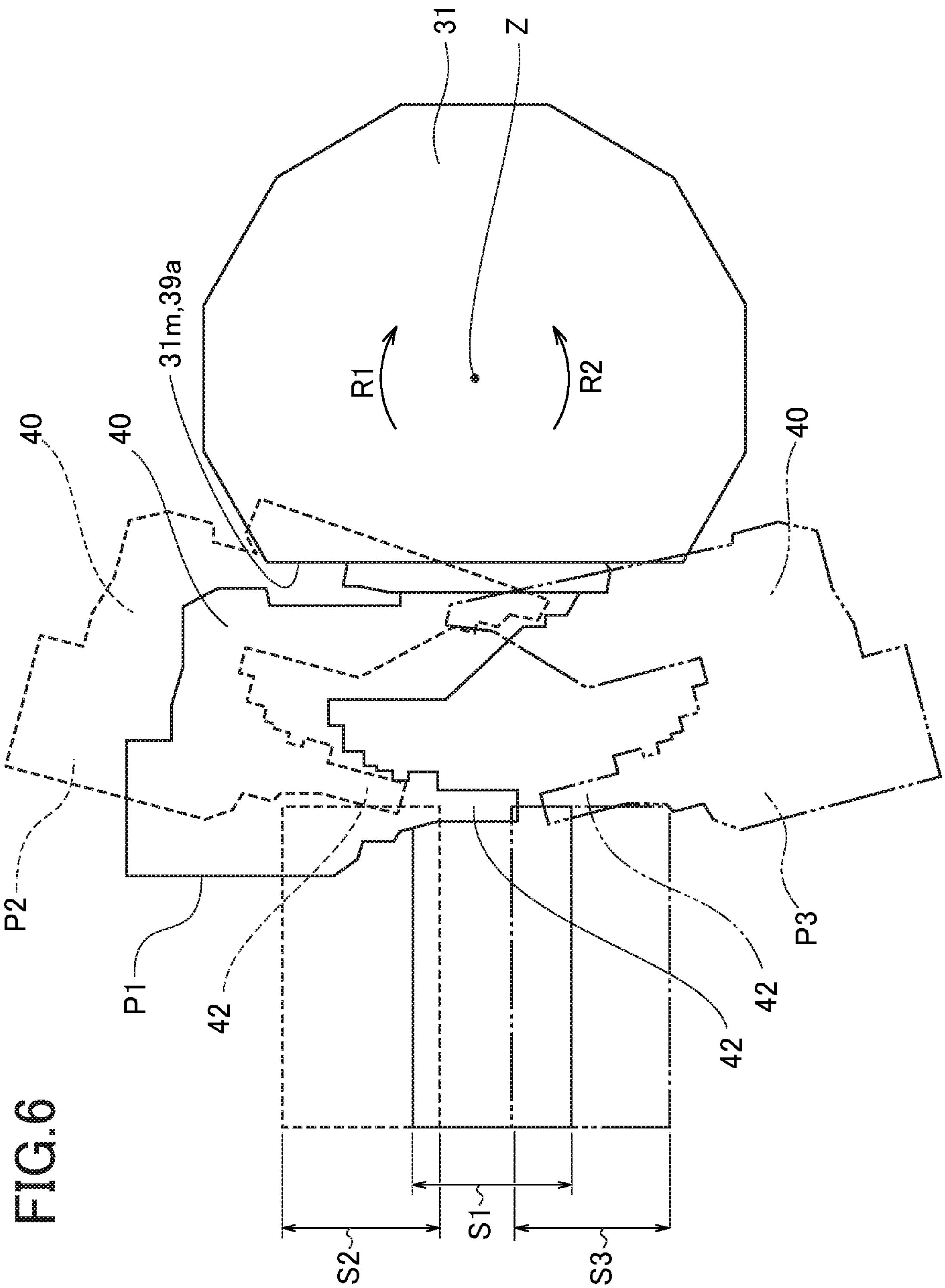
FIG. 6 is a schematic view illustrating a machinable range with a tool when the turret is in a general position, an upper position, and a lower position.
Figure 7:
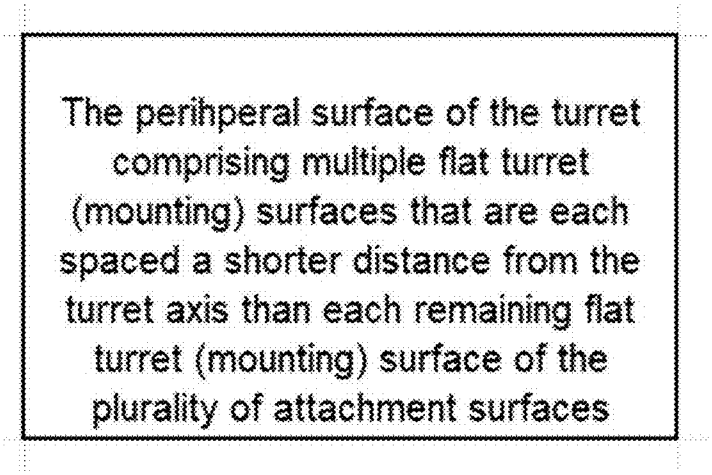
FIG. 7 is a text box which advises that the peripheral surface of the turret comprises multiple flat turret (mounting) surfaces that are each spaced a shorter distance from the turret axis than each remaining flat turret (mounting) surface of the plurality of attachment surfaces.

FIG. 6 is a schematic view illustrating a machinable range with the rotation tool 42 when the turret 31 is in a regular position P1 (corresponding to selected turned position), an upper position P2 (corresponding to position different from selected turned position), and a lower position P3 (corresponding to position different from selected turned position).

As illustrated in FIG. 6, the automatic lathe 100 of the present embodiment has a range S1 illustrated by a solid line as the machinable range that is the range of the rotation tool 42 by moving the first tool post X axis slide 15 and the first tool post Y axis slide 16 in the regular position P1 when machining the workpiece with the rotation tool 42 of the rotation tool unit 40.

On the other hand, the automatic lathe 100 of the present embodiment has a range S2 illustrated by a broken line as the machinable range that is the range of the rotation tool 42 by moving the first tool post X axis slide 15 and the first tool post Y axis slide 16 in the upper position P2 in which the turret 31 is turned upwardly and has a range S3 illustrated by a two-dot chain line as the machinable range that is the range of the rotation tool 42 by moving the first tool post X axis slide 15 and the first tool post Y axis slide 16 in the lower position P3 in which the turret 31 is turned downwardly.

According to the automatic lathe 100 of the present embodiment, the machinable range can be expanded from the range S1 to the ranges S2-S1-S3 when the rotation tool 42 can be rotated in the upper position P3 and/or the lower position P2 except the regular position P1.

The rotating shaft 36_a_ and the rotating shaft 37_a_ should be constantly connected except when the turret surface 31_n_ is disposed in the undermost surface (undermost surface in Y axis direction) of the turret 31 in order to rotate the rotation tool 42 in the upper position P2 and/or the lower position P3.

In the upper position P2 and the lower position P3, the inclination of the rotation tool 42 relative to the workpiece differs from that when the workpiece in the range S1 is machined in the regular position P1. However, a control portion of the automatic lathe 100 adjusts the phase of the workpiece relative to the rotation tool 42 by rotating the front main spindle 20 in accordance with the inclination of the rotation tool 42 (to cancel inclination), so that the workpiece can be machined as if the workpiece is machined in the regular position P1 without the inclination of the rotation tool 42 relative the workpiece.

As the distance between the workpiece W and the leading end of the rotation tool 42 can be longer than the distance in the regular position P1 by turning the turret 31 to the upper position P2 and the lower position P3, the rotation tool 42 having a long length along a CO axis direction can be used. By using the rotation tool 42 having a long length along the CO axis direction, a hole that penetrates through the workpiece W in the diameter direction can be provided.

The automatic lathe according to the present disclosure is not limited to an automatic lathe. In the machine tool according to the present disclosure, the tool attached to the turret surface having the length from the turning center of the turret shorter than that of the other turret surfaces may not be the rotation tool unit turning about the B axis.

In the machining tool according to the present disclosure, the turret surface having the length from the turning center of the turret shorter than that of the other turret surfaces is not limited to one surface, and two or three turret surfaces may be used. In the machining tool according to the present disclosure, the number of turret surfaces may not be limited to 10.

As described above, the embodiment of the present disclosure is described in detail with reference to the drawings. However, the embodiment is only an example, and is not limited to the above embodiment.

The invention claimed is:

1. A machine tool comprising:

a main spindle that holds a workpiece; and a turret, the turret including a peripheral surface which extends about a turret axis, and further including an end surface which extends orthogonal to the turret axis, the peripheral surface defining a plurality of attachment surfaces, and a single tool being mounted on each of the plurality of attachment surfaces, respectively, wherein the peripheral surface and the end surface interface with one another such that the end surface forms a respective edge with each of the plurality of attachment surfaces of said peripheral surface, wherein the workpiece is machined with a selected one of the tools, the selected one of the tools being selected by rotating the turret about the turret axis so that the selected one of the tools faces the workpiece for machining, wherein, for each edge formed between the end surface and a corresponding one of the plurality of attachment surfaces, a respective virtual line segment extends parallel to the end surface and extends radially from the turret axis to the corresponding edge, and wherein for at least one attachment surface of the plurality of attachment surfaces of the turret, the respective virtual line segment corresponding thereto has a total length that is shorter than a respective total length of each individual remaining virtual line segment, each individual remaining virtual line segment corresponding to one remaining attachment surface of the plurality of attachment surfaces that does not include the at least one attachment surface.

2. The machine tool according to claim 1, wherein the tool attached to the at least one attachment surface is disposed closer to the end surface than is the respective tool attached to each remaining attachment surface of the plurality of attachment surfaces.

3. The machine tool according to claim 1, wherein the tool attached to the at least one attachment surface is a rotary tool that rotates about an axis extending orthogonal to the at least one attachment surface.

4. The machine tool according to claim 1, wherein the turret is movable in a plane extending orthogonal to an axis direction of the main spindle, a rotary tool attached to the at least one attachment surface is rotatable when the turret is rotated into a position different from a current position, and a phase of the workpiece is adjusted by rotating the main spindle in accordance with an inclination of the rotary tool when the turret is rotated.

5. A machine tool comprising:

a main spindle for holding a workpiece; and a turret, the turret having a peripheral surface extending entirely about a turret axis, and further having an end face which intersects the turret axis, the peripheral surface defining a plurality of attachment surfaces, wherein each of the plurality of attachment surfaces is formed as a respective flat mounting surface on which is mounted a single tool holder holding a single tool, respectively, wherein the workpiece is machined with a selected one of the tools, and the turret is rotatable about the turret axis for facing the selected one of the tools across from the workpiece for machining, wherein each flat mounting surface of the plurality of attachment surfaces is spaced a radial distance from the turret axis, and wherein a respective virtual line segment extends parallel to the end face and further extends radially from the turret axis to each flat mounting surface of the plurality of attachment surfaces, and wherein for at least one flat mounting surface of the plurality of attachment surfaces, the respective virtual line segment corresponding thereto has a total length that is shorter than a respective total length of each individual remaining virtual line segment, each individual remaining virtual line segment corresponding to one remaining flat mounting surface of the plurality of attachment surfaces that does not include the at least one flat mounting surface.

6. The machine tool according to claim 5, wherein each flat mounting surface has a respective length and a respective width, and wherein the length of the at least one flat mounting surface is greater in length than a corresponding length of each remaining flat mounting surface of the plurality of attachment surfaces.

7. The machine tool according to claim 5, wherein the at least one flat mounting surface comprises multiple flat mounting surfaces that are each spaced a shorter distance from the turret axis than each remaining flat mounting surface of the plurality of attachment surfaces.

* * * * *